Figure 1:
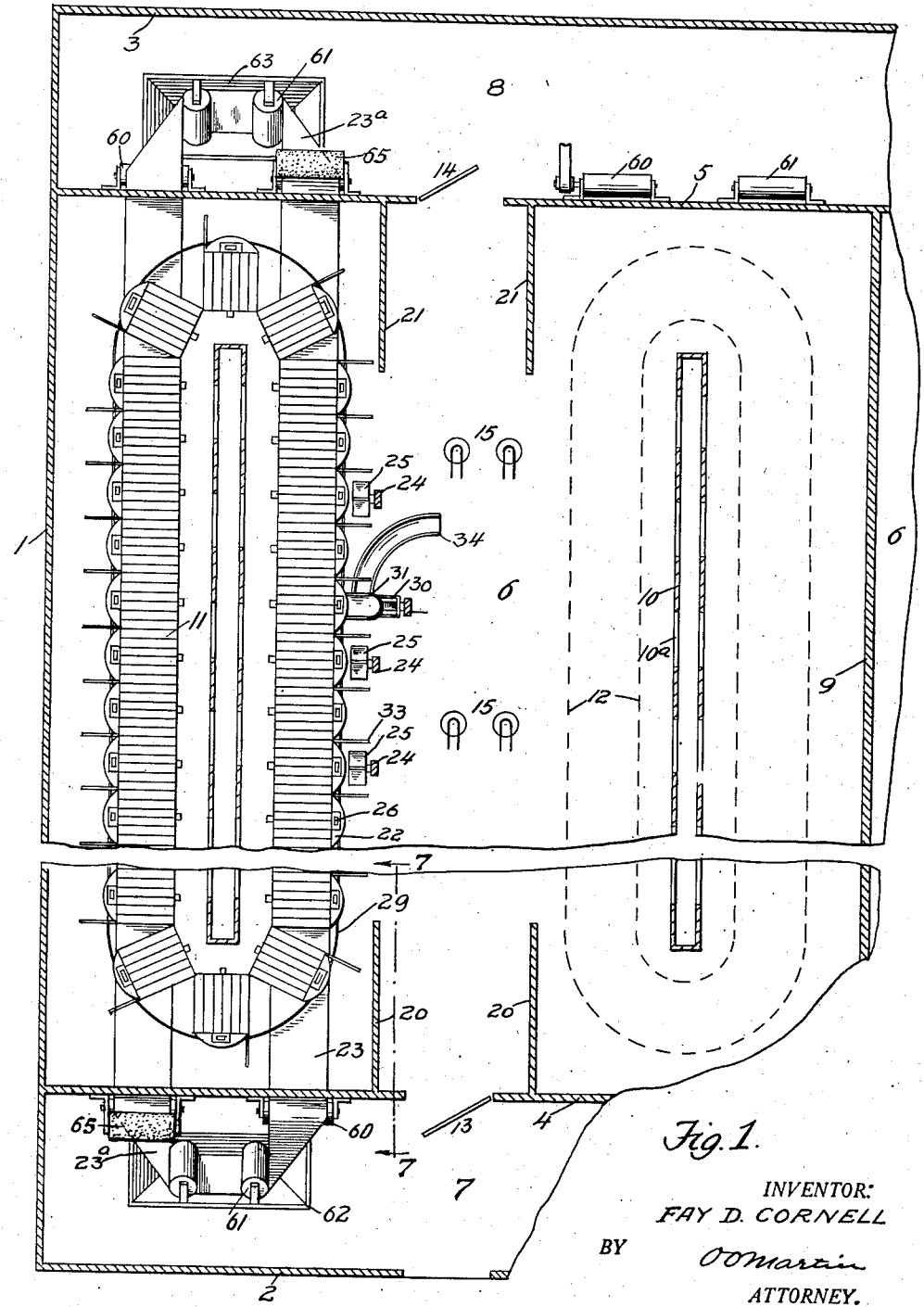

Oct. 7, 1941.    F. D. CORNELL    2,257,734
HUSBANDRY SYSTEM
Filed Aug. 5, 1935    6 Sheets-Sheet 1

INVENTOR:
FAY D. CORNELL
BY    OO Martin
ATTORNEY.

Oct. 7, 1941.　　　F. D. CORNELL　　　2,257,734
HUSBANDRY SYSTEM
Filed Aug. 5, 1935　　　6 Sheets-Sheet 5

INVENTOR:
FAY D. CORNELL
BY O. O. Martin
ATTORNEY.

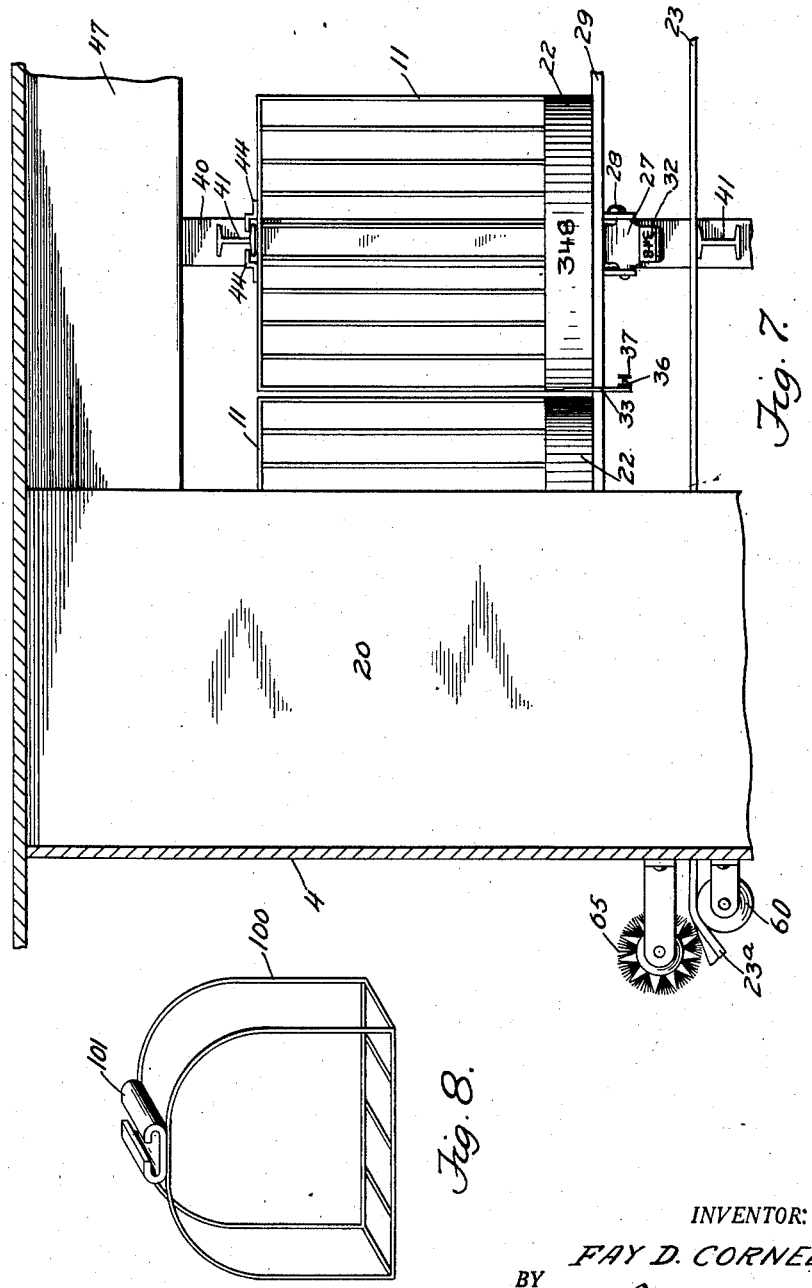

Patented Oct. 7, 1941

2,257,734

UNITED STATES PATENT OFFICE 2,257,734

HUSBANDRY SYSTEM

Fay D. Cornell, Pasadena, Calif., assignor to Austin O. Martin and Elmer Hoffman, both of Los Angeles, Calif.

Application August 5, 1935, Serial No. 34,680

36 Claims. (Cl. 119—21)

This invention relates to means for housing animals and plant life, and has particular reference to a system and equipment for propagating and maintaining such beings under mechanically controlled conditions of temperature, humidity, sanitation, feeding and servicing. This application is a continuation in part of application, Ser. No. 738,633, heretofore filed by me on August 6, 1934.

For the sake of simplicity, the following description will be limited to the application of the system and equipment of my invention to the housing, growing and maintaining of laying hens, with the understanding that the invention has a much broader scope of utility not only in connection with poultry but with all living beings, animal and vegetable.

Modern research work on the breeding, production, maintenance and marketing of poultry and eggs has set aside many of the theories and practices of the past and has set up new principles and standards. It has been established by such researches that health, vitality, productivity and longevity in poultry are not dependent upon exercise or exposure to the sun, provided adequate vitamin D is supplied by other means; that diseases either are inherited tendencies, which can be effectually eliminated through rigid and intelligent selection of breeders, or are contracted through infestation, exposure and contagion; and these causes, and therefore the manifestation of the diseases, can be eliminated by absolute sanitation, by dependable control of temperature, humidity and ventilation, also by segregating the birds into small groups, or by confinement in individual compartments or cages.

These determinations have been recognized by and taken advantage of my breeders, producers and feeders, until now a majority of commercially produced chickens are brooded on wire mesh floors, largely in multiple-deck compartments, and such compartments are usually arranged in vertical units of four each, mounted on a wheeled base, and termed batteries. Laying hens are also housed in such multiple-deck batteries, but usually individual cages. Most of the large poultry packers and feeders have adopted the battery system in all modern plants.

In the use of batteries, usually installed in large floor areas, temperature and humidity control and ventilation have proved problems, but the greater problem has been sanitation. The practice is to employ manual labor to clean, with a scraper, the droppings from individual, removable trays positioned below the wire mesh floor of the brooder baskets, the laying hen cages, or the fattening compartments, as the case may be. In some cases, a section of roofing paper is drawn back and forth underneath a group of such compartments and the droppings are scraped from the paper. This practice is laborious, expensive, ineffective, not resulting in complete sanitation.

It is the general practice to deliver and distribute throughout the battery room the necessary feeds and supplies by manual labor, also manually to remove the constantly accumulating droppings. In some cases, water supplies are piped to the batteries, or to convenient points, but in many cases the water is manually brought to the individual cages.

In view of the foregoing remarks, the general objects of the invention are:

1. To install housing and servicing equipment in a well insulated and light controlled building of special design.

2. To provide means for maintaining in such building uniform temperature and humidity and a continuous circulation of washed fresh air.

3. To provide equipment for continuously moving, at a fixed rate of speed, a train of multideck compartments or cages alongside fixed or movable racks or supports designed to hold containers for various feeds and fresh water.

4. To provide means for dividing the space through which the multi-deck train of batteries passes into zones, one portion well lighted, to represent day-time or service-time, and the next following zone to represent night-time or rest-time.

5. To provide means and equipment to receive and hold droppings; mechanically to dispose of such droppings, and to clean and disinfect such equipment during the progress of travel of the train of batteries.

6. To provide equipment and means to irradiate with rays from fixed batteries of sun lamps, having vitamin D potency, the said cages or compartments and the fowls therein as the train of batteries passes a certain point or zone.

7. To provide means and equipment for automatically and mechanically numbering, weighing, gathering and transporting all eggs laid by hens confined within the cages.

8. To provide means and equipment for permanently recording photographically all of the essential data disclosed in the continuous operation of gathering, numbering and weighing eggs laid by hens confined within the cages of my invention.

Figure 2:
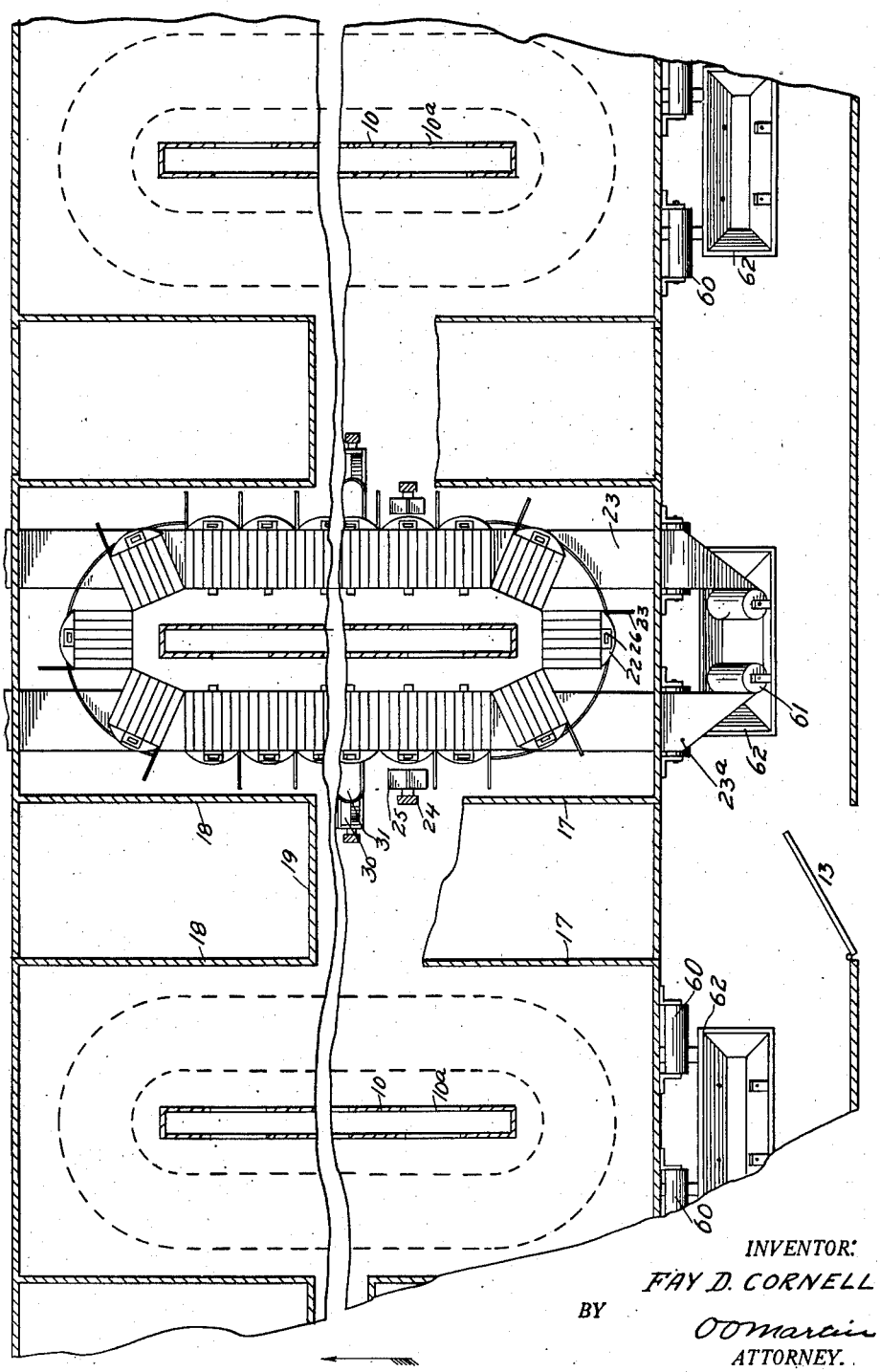
Figure 3:
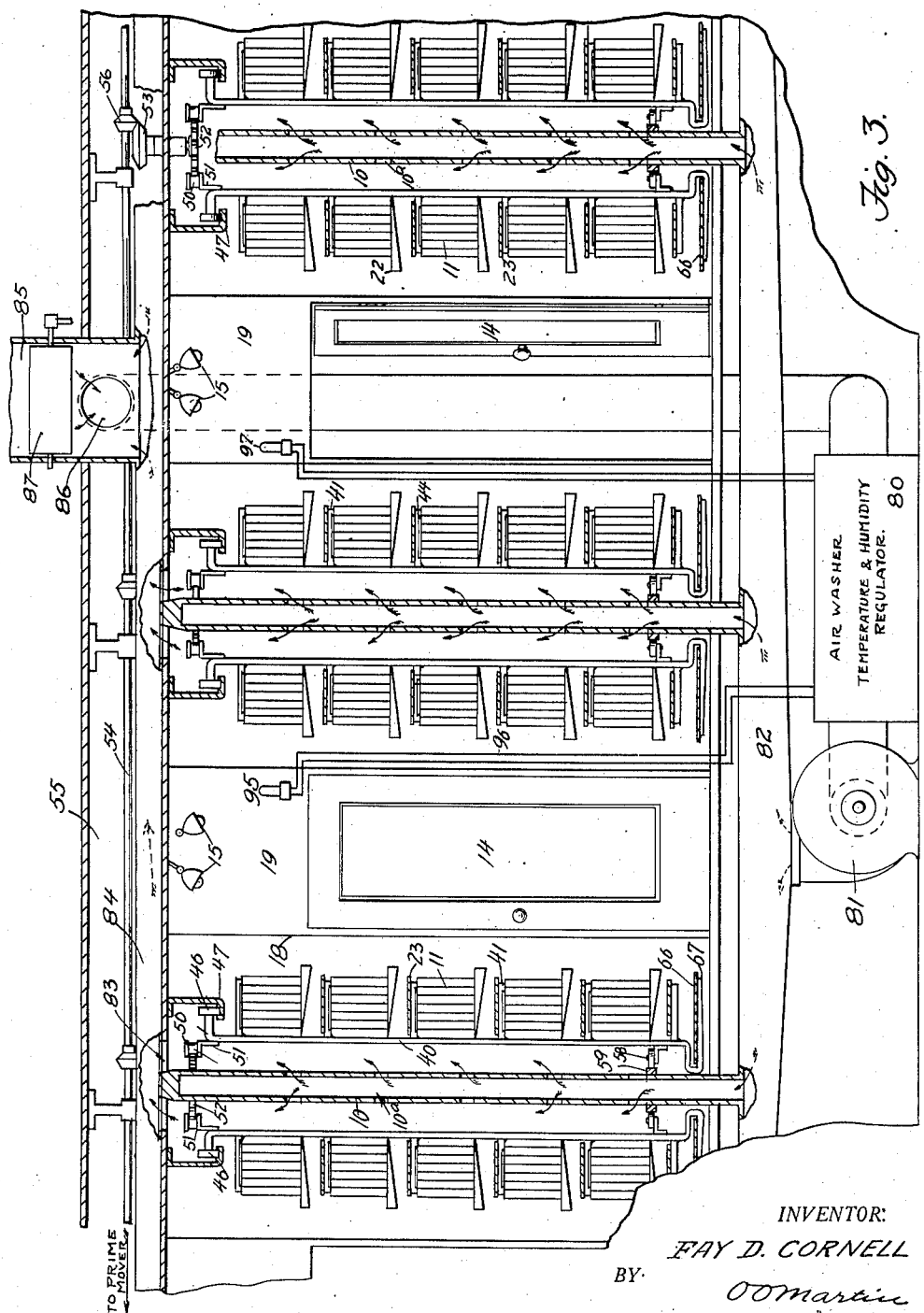
Figure 4:
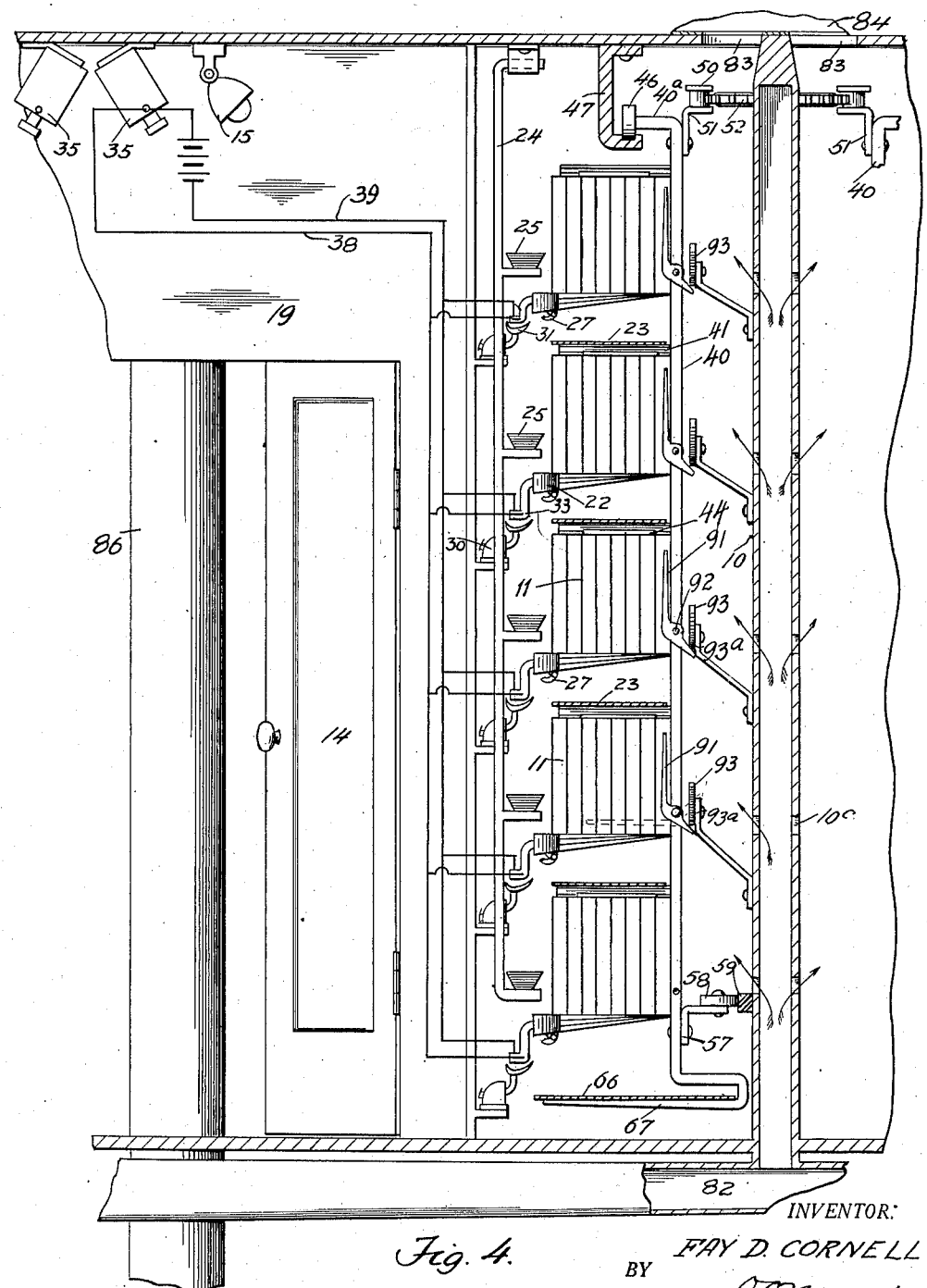
Figure 5:
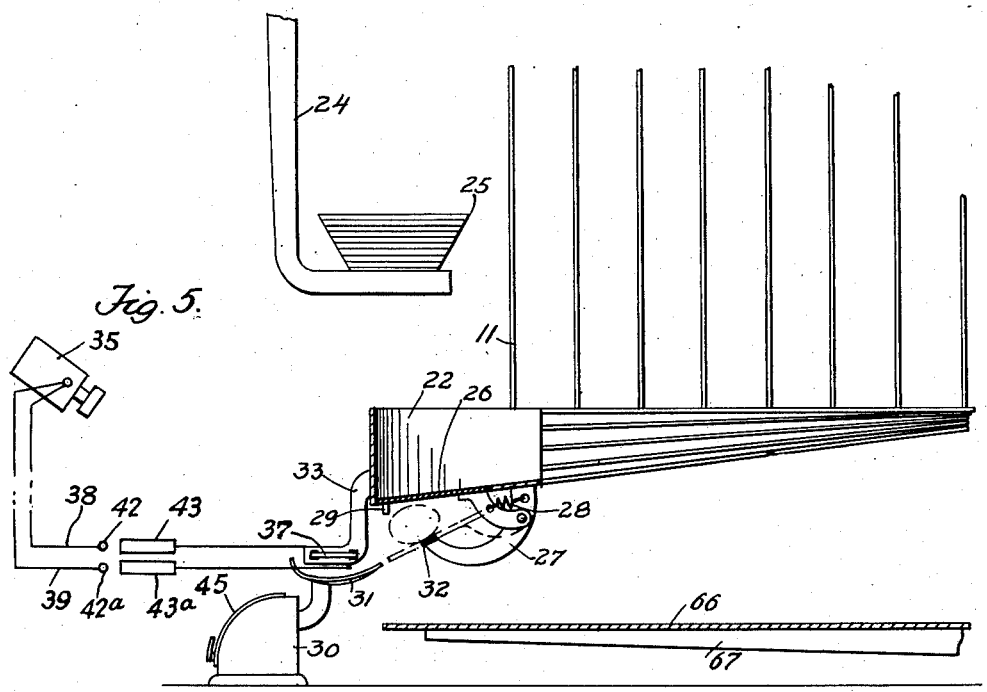
Figure 6:
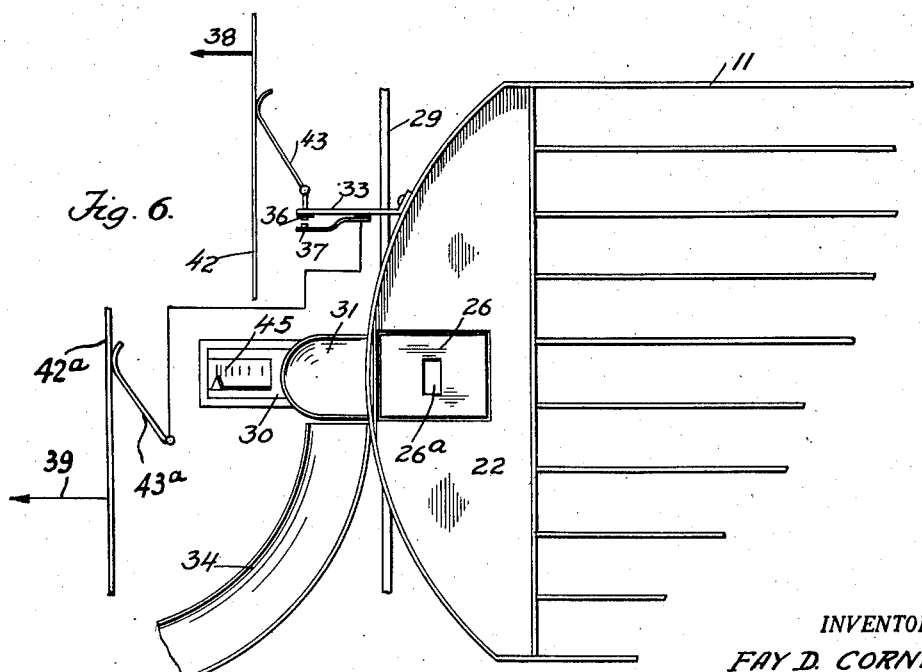

With these objects in view, the invention consists in the combinations and important features hereinafter fully described and illustrated in the accompanying drawings, of which:

Fig. 1 is a sectional plan view of one end of a building within which the more important parts of the system of the invention are shown installed, Fig. 2 is a sectional plan view of a portion of a building equipped substantially in the same manner as that of Fig. 1 but showing a modified arrangement of means for dividing the building into lighted and darkened zones, Fig. 3 is a sectional elevation substantially in agreement with and taken along the break through the center of Fig 2, in direction of the arrow, Fig. 4 illustrates part of the right hand portion of Fig. 3, on a larger scale, and contains features not illustrated in Fig. 3, Fig. 5 is a detail view of a portion of Fig. 4, with parts broken away, Fig. 6 is a top plan view of the structure shown in Fig. 5, Figs. 7 is a fragmentary front elevation of a portion of Fig. 1 and is taken on a plane substantially defined by a line 7—7 parallel to and just right of the left hand part 20 in Fig. 1, and Fig. 8 is a detail view of a form of a detachable container carrier.

Referring in the first instance to Fig. 1, the numeral 1 denotes the outer end wall of a building within which the system of the invention is placed, and the outer side walls are numbered 2 and 3. Parallel with these outer side walls and spaced therefrom are inner walls 4 and 5, which divide the building into an inner space, flanked by outer compartments 7 and 8. The inner space of the building is by partitions divided into a series of separated sections 6. The numeral 9 denotes the first of these partitions, the total number of which depends upon the length of the building. As the mechanisms within each section 6 may be exactly alike, only one section is illustrated and described in connection with Fig. 1.

Two partitions, 10, are mounted from floor to ceiling within each section, parallel to the end wall 1, and these partitions are somewhat shorter than the distance between the inner walls 4, 5, in order to afford room at each end of each partition for the passage of an endless conveyor. This conveyor is constructed to carry the cage units 11 of my invention, as will presently be described. As all the conveyors of the building may be alike, only one is diagrammatically outlined in Fig. 1, and the second conveyor combination is merely indicated in dotted outlines referred to by the numeral 12. In this arrangement, a work alley is provided between the two conveyors 11 and 12, and exits to the outer compartments are provided and controlled by suitable doors 13, 14.

The partition 10 divides the space occupied by the train or battery of cages carried by the conveyor into two groups, a day zone and a night zone. To this end, I have shown illuminating means, conventionally indicated at 15, designed to maintain the daylight zone flooded in continuous artificial daylight. In order to insure sufficient darkness within the night zone, it is well to provide partitions 20, 21, to extend some distance from the inner walls 4, 5. It was above stated, that the building should be light controlled, and having these partitions extend from floor to ceiling, it is readily seen that the light within the night zone may be sufficiently reduced to induce dormancy. In the continuously illuminated work alley, all activity takes place. The speed of the conveyor is calculated to afford the birds ample feeding time, and this timing may be modified to suit particular conditions.

The cages of the invention are, as above stated, of the multideck type, there being in the drawings shown five cages in each vertical unit. Each cage is made with a grated or barred floor, forwardly inclined to permit such eggs as may be laid to roll to the front and there to land in the center of a projecting tray 22, from which the eggs may be manually collected or automatically discharged, as will hereinafter be described. Below the floor grating is a dropping catcher which, in this case, is made in the form of an endless belt 23. The droppings fall through the floor grating on to this belt, and the belt passes through slits in the inner walls and into the antechambers 7, 8, where the belt is thoroughly scrubbed and completely cleansed before it again returns to the inner room. The belt may be driven independently of the conveyor at any suitable speed, but I have found it convenient merely to rest the belt on the conveyor portions which support the cages, in which case no special driving mechanism is required, as the weight of the belt on the conveyor is sufficient to carry it along.

Feed and water receptacles are placed on stands in front of the cages along the daylight zone, in accordance with any suitable arrangement. Brackets 24 are in the drawings shown suspended from the ceiling and carrying troughs 25, but this is merely illustrative of a simple means of supplying feed and water to the cages. Conveyors or wheel trucks may conveniently be substituted, if preferred. The important point to consider in such arrangement is, that feed best suited for and preferred by the individual bird may be supplied by providing a series of troughs, each containing a different kind or mixture of feed from which the bird can select that which it prefers; also that an opportunity is afforded to study and to balance the diet correctly to maintain the birds in vigorous and robust condition.

Where the feed is manually placed in trays of each cage of a stationary battery or batteries, as heretofore used, it is commercially impossible to supply each bird exactly that which suits its constitution best, and it is equally impractical to keep the hundreds or thousands of feed trays so frequently and thoroughly cleansed as to prevent molding of the feed left in the corners of the trays. But in the system of my invention, the attendants have only to remove and replace a relatively small number of troughs and these are conveniently arranged along the central work alley. A number of troughs may be placed on each bracket or wheel truck, and each trough may be divided into compartments for different kinds of feed, if desired.

The eggs, as above stated, roll into the projecting trays 22 and land on a trap door 26, see also Figs. 4, 5 and 6. This door is shown pivoted on a pendent bracket 27 and normally held elevated by a counterbalancing spring 28. It is furthermore to be noted that a rail 29 is arranged to extend around the entire length of the conveyor under each deck or tier of cages to maintain the trap door closed when an egg rolls into the tray 22. At a suitable point, within the day zone, a break occurs in this rail, and below the space in this manner provided is shown placed a weighing device 30. If no egg is present, the trays pass this opening undisturbed, but the weight of an egg causes the trap door to swing open to permit the egg to drop on to a weighing pan 31, whereupon the spring 28 again elevates this door. It is desirable to place on the egg the number or symbol of the cage from which it is expelled, and this may readily be accomplished in various ways, one method here illustrated consisting in placing a soft rubber stamp 32, see also Fig. 7, below the trap door in alinement with an opening 26a of the door. As the door drops, it will be seen that the egg comes into contact with this soft stamp to receive an impression of the cage member. On each cage, behind the egg tray, is mounted an arm 33, which normally travels idly past the weighing mechanism but, if an egg has passed from this tray into the weighing pan, it is seen that the arm comes into contact with the egg as it passes over the pan, thereby to push the egg on to suitable means, such as a chute 34, see Fig. 6, along which the egg is carried away.

The mechanism just described is illustrative of a means of automatically gathering and marking the eggs from the cages and of obtaining the correct weight of each egg. For statistical purposes, it now becomes necessary to obtain a permanent record of this transaction, and this is readily accomplished by placing a photographic camera 35 in front of the vertical row of weighing devices in such position that it may be focussed on these devices, see Fig. 4. On the arm 33, insulated therefrom, are two contacts 36 and 37 which, through conductors 38, 39 are connected to operate the shutter of this camera. The arm 33, moving against the egg on the scale pan, closes the circuit which operates the shutter to take an exposure of the egg and of the weight indicating scale 40. If, in addition, the number of the cage is displayed at a point within the range of the camera, it is seen that a complete and permanent record is obtainable. In Fig. 7, the cage numbers are indicated on the front of the cage trays for convenience of illustration, but a better position may be selected. The camera should be of the motion picture type, fitted with a roll of film and with mechanism for advancing this film one step after each exposure. By means of a projecting machine, the developed film may then be projected on a screen to enable the statistical clerk to enter the record on his books. The camera circuit is, in Fig. 4, merely conventionally outlined but, as the switches travel with the cages it is, of course, necessary to provide a sliding contact between each switch and the conductor 38. Such contact is, in Fig. 6, conventionally shown to comprise a shoe 41, of the switch, riding on a stationary rail 42, from which the conductor 38 extends to the camera.

For manual collection, it is not necessary to provide the trap door and its operating mechanism but the bottom grating itself may be extended to form a basket into which the egg may roll, exposed to the view of the attendant.

The conveying mechanism by means of which I illustrate a convenient method of suspending the cages in vertical units is, in Figs. 3, 4 and 7, shown to comprise a series of vertically disposed bars 40, on which laterally projecting arms 41 are rigidly mounted. The top of each cage is fitted with guides 44, 44, of a shape to ride on the arms 41, substantially as shown, firmly to hold the cage suspended. An advantage of this arrangement is the ease with which a cage may be withdrawn from the conveyor and again mounted. It is also noticed that the dropping belts 23 conveniently may rest on these arms, to be carried around with the conveyor, as above suggested. The upper end of each bar 40 is shown made with a horizontal extension 40a, carrying one or more rollers 46 riding in a stationary track 47. A conveyor chain 50 is, by means of a special link 51, operatively connected to move the bars 40, and the chain is bent over a sprocket wheel 52, see Figs. 3 and 4. The sprocket wheels of the conveyors are shown fixed on vertical steel shafts terminating in bevel gears 53. A line shaft 54 is shown horizontally extending through the building, within a space 55 above the ceiling, and it carries bevel pinions 56 in mesh with the gears 53. The line shaft is, in any suitable manner, connected for operation by a prime mover (not shown). The opposite end of each conveyor is bent over a similar sprocket wheel (not shown), but the driving connections, just described, need not be duplicated. The bars are, near the lower end, fitted with brackets 57, carrying wheels 58 which ride on a stationary rail 59 to maintain the cage units in alinement. In such, or any other suitable manner, the cages are movable continuously through the zones of the system, the drawings being merely illustrative of means for detachably supporting and moving the cages of the vertical units.

The belt 23 is shown bent over a series of idlers 60, 61 to form downwardly directed loops 23a, which conveniently may extend into suitable rinsing pans 62, 63 through which the belt is caused to travel very slowly. This is illustrative of a simple means of cleaning the belt, but it is advisable to provide means for scrubbing or scraping the belt. To this end, I show a rotatable brush 65 mounted at each end of the belt, see Figs. 1 and 7. In Fig. 2, this brush is, for the sake of clearness, not shown, but I wish it understood that scrubbing means should be applied to all the belts.

Even with these belts, there is a danger that some matter may drop, or by the animal may be thrown beyond the belt to land on the floor behind the cages, there to accumulate. Such accumulation of droppings must not be allowed to remain on the floor very long, but must be removed periodically. Or a wide belt 66 may conveniently be hung close to the floor for the purpose of catching such droppings. The construction and operation of this floor belt may be substantially as described in connection with belt 23, or the lowermost belt 23 may simply be replaced by this wide belt, substantially as indicated in Fig. 4. The bar 40 is, for this purpose, shown fitted with a gooseneck-shaped horizontal projection 67 on which to rest this wide belt.

If, however, it is desired to employ dropping plates instead of belts, such plates may readily be placed on the arms 41. The use and cleaning of such plates would, of course, entail much manual labor and necessitate the exercise of great care in removing and replacing the plates. If such scrubbing means as the brushes 65 are employed it will, of course, be necessary to provide means for rotating the brushes in any suitable manner.

In case a perch is required for the bird to roost on during the night periods, such may also readily be provided. Such perch is, in Fig. 4, shown to comprise a lever 91, pivotally hung at 92 on the support bar 40. The rear end of this lever normally travels along the underside of a stationary rail 93, extending along the entire daylight zone. The ends of this rail are curved upward at both ends, as indicated at 93ª, to permit the lever to drop slowly into position at the beginning of the rest period and again to be raised very slowly upon approaching the daylight zone. All the cages may be fitted with such roosts, but these devices are, for the sake of clearness, only shown in Fig. 4.

The building is, as above stated, made substantially air-tight. Means must therefore be provided for circulating air through the building. But, as the open market affords various highly efficient air conditioning systems adaptable for use in buildings of this type, it is not thought necessary here to describe such system in detail. Connections for circulating conditioned air will, however, now be briefly described. Below the floor of the building, see Fig. 3, is conventionally shown mounted a suitable, commercially well known air conditioning apparatus 80. A blower 81 is shown connected to force air from this apparatus, through a main distributing duct 82, into the partitions 10 which, for this purpose, are made hollow and provided, with series of apertures 10ª. The air escapes through these apertures then to rise about the cages and to pass through vents 83 in the ceiling leading into a duct 84, from which it may exhaust into the atmosphere, through a flue 85. A conduit 86 is provided to return air from the flue to the conditioning apparatus. It is well to provide a damper in the flue above the entrance to this conduit to regulate the flow of air in accordance with outside atmospheric conditions.

From this, it is seen that purified air continuously may be circulated through the cages at a speed proportionate to the number of birds occupying the cages. If it is found desirable to draw air from above, through the partitions and down into the conditioning apparatus, this may, of course, readily be done by merely reversing the lower connections. The temperature and humidity conditions must be regulated, and to this end I show a temperature responsive bulb 95 suitably positioned and connected by wires 96 with the conditioning apparatus. A wet bulb 97 is similarly connected with this apparatus for the purpose of controlling the moisture contents of the circulating air. All of this is, of course, merely illustrative of air conditioning. It is for the architectural engineer to design a system to suit the space to be served and number of animals to be housed.

The cage and conveyor structures of Figs. 3 and 4 are substantially in agreement with those of Fig. 1. These views are added merely to show a somewhat different distribution of the light and dark zones, and this is effected by a rearrangement of partitions. In Fig. 1, as explained, the building is divided into sections, each containing a pair of cage carrying conveyors. The sections may be served by common power and air conditioning apparatus, or each section may have its own service.

In the arrangement of Figs. 2 and 3, on the other hand, no complete separation of sections is found, and the air is free to circulate through the entire length of the building. This is effected by eliminating the partitions 9 and by extending the partitions 20, 21 further into the building. These extended partitions, 17, 18, should extend far enough along the sides of the conveyors to create a night zone at each end of the conveyors, and cross partitions 19 may be added, above the height of the doors, further to exclude light from the end portions of the conveyors. According to this arrangement, a daylight zone and a work alley are provided between each pair of conveyors. This is the more economical plan and may be preferable where the whole building is occupied by the same species, requiring similar air and feed conditions. In the structure of Fig. 1, on the other hand, laying hens may be housed in one section, brooders installed in another, rabbits in yet another, and so forth, each species requiring its own particular treatment or service.

But aside from this difference of arrangement, all components of the system may remain the same. On account of the limited space available, Figs. 1 and 2 have been broken apart intermediate the side walls, but I wish it understood that the conveyors may be of any desired length and that, according to the arrangement of Fig. 2, there may be additional partitions 17, 18, 19 arranged across the building to provide additional alternate light and dark zones.

In such manner, and by employing well known air washing and conditioning apparatus, it is possible to maintain uniform air conditions throughout the building. And with the traveling cage units providing uniformly fixed day and night periods, a condition resembling continuous spring, the ideal season for egg laying and the production of healthy, vigorous birds, is attained.

It should be clear to anyone familiar with animal husbandry or plant propagation that the system of my invention is widely adaptable. Of course, in raising mammals, the egg gathering and recording apparatus is not required, but otherwise the system remains substantially as outlined. Nor will cages be suitable for plant propagation, but suitable trays may conveniently be substituted. The feed troughs would in such cases also be replaced by water, fertilizer and insecticide spraying equipment, but the underlying principle of my invention remains unchanged.

While therefore the cages 11 are suitable for housing chickens, modified forms are preferable to hold other kinds of living beings. But, as the cages are shown detachable, it is an easy matter to substitute containers best suited to accommodate their occupants. As an illustration, I have, in Fig. 8, shown a bracket 100, fitted with a guide 101 for insertion on the arms 41. Such bracket may be shaped to support a rabbit hutch, a plant propagating tray or any other desired container or pen.

Other variations and modifications of the system of my invention may be introduced to suit particular conditions, but the fundamental importance resides in the convenience and ease with which correct and uniform diurnal and nocturnal periods may be maintained; in maintaining uniform air condition; in supplying the most beneficial feed to the individual animal without any additional effort; in the case with which such feed may be kept fresh and pure; in the means of obtaining complete and correct record of the performance of each animal or plant.

From the foregoing, the objects of the invention should be apparent to anyone versed in the art. There may be provided any number of day and night zones. The cages continuously move past relatively stationary supply stations and recording devices, but whether the cages are carried on endless conveyors, as herein illustrated, or are other-wise supported, is immaterial so long as they pass through alternate day and night zones, The lights used may be of the ultra violet vitamin D producing type commercially used in present day irradiation practice, or such illuminating means as may in the future be deemed most suitable, may be substituted.

For the sake of simplicity of illustration and description, no attention has herein been paid to correct proportioning or preferred arrangement of the various features of the system, and merely enough had been shown to illustrate the scope of the invention, as set forth in the following claims.

I claim:

1. In a husbandry system, in combination, means for creating light and dark zones, supply stations in the light zones, endless series of means for continuously carrying birds to be supplied from such stations past the stations and through said darkened zones, and means within the light zones actuated by an egg in one of the carrying means for obtaining a permanent record that an egg has been laid in that carrying means as it passes a given point of travel.

2. The combination with supply stations, of endless conveyors arranged on each side of said stations, cages suspended from said conveyors, means for operating said conveyors at a predetermined uniform rate of speed to carry said cages past the said stations, and means for dividing the space occupied by the cages on the conveyors into zones of suitable light and darkness.

3. Within a light excluding space, the combination with a pair of endless horizontally moving conveyors arranged side by side to provide a passage between the conveyors, of batteries of cages mountable on said conveyors, means for lighting only the passage between the conveyors to illuminate the cages passing along the sides of said passage, and stationary supply stations between the conveyors.

4. In a substantially light and air tight building, continuously moving endless conveyors within said building and arranged in parallel relation to provide a work alley between each pair of conveyors, stationary supply stations in each work alley, batteries of cages mountable on said conveyors successively to pass by said stations, means for dividing the space occupied by said cage carrying conveyors into alternate zones of light and darkness, and means for continuously circulating air of predetermined temperature and humidity through the building.

5. In a substantially light and air tight building, suitable illuminating means, continuously moving conveyors arranged in parallel relation having a work alley between each pair, means for conditioning the air within the building, supply stations in each work alley, horizontal tiers of cages held suspended from said conveyors to move slowly past said supply stations, and continuously moving means below each tier of cages for passing droppings from the cages away from the path of travel of the cages on the conveyors.

6. The combination with a continuously moving conveyor, of batteries of cages mountable in tiers on said conveyor, and a continuously moving belt under each tier of cages to carry droppings from said cages away from the path of travel of said cages.

7. The combination with a supply station, of a continuously moving conveyor, cages held suspended in tiers from said conveyor to travel past said station, means movable to enter beneath and to pass beyond each tier for carrying away droppings from the cages, and means at said stations for carrying eggs laid in said cages away from the cages.

8. In a husbandry system, a continuously traveling endless conveyor, batteries of numbered cages mountable on said conveyor, means for carrying eggs laid in the cages away from the cages, and means for recording the weight of each egg together with the number of the cage from which it came while the egg is being carried away from its cage.

9. In a substantially light excluding and air conditioned building, means dividing the building into zones, means for continuously suitably lighting some of the zones, stationary supply stations in each lighted zone, batteries of cages, and means for continuously moving each battery at a predetermined rate of speed through its respective lighted and dark zones and past its respective stations.

10. In an air conditioned building divided into continuously lighted and darkened zones, batteries of cages arranged in tiers, means for continuously moving said batteries through their respective zones, endless belts, means for continuously passing each belt below and beyond each tier of cages to carry droppings from said cages away from the path of travel of the cages, and means for cleaning said belts before they return under the tiers of cages.

11. In an air conditioned building divided into continuously lighted and darkened zones, supply stations in said lighted zones, endless trains of cages, means for continuously moving said cages in a fixed path through their respective zones past their respective stations, and means for continuously carrying droppings from said cages away from the path of travel of said cages.

12. In an air conditioned building divided into continuously lighted and darkened zones, supply stations in said lighted zones, endless trains of cages, means for continuously moving said cages through their respective zones past their respective stations, means within the lighted zones for carrying eggs laid in the cages away from the cages, and means for obtaining a complete record of each egg as its leaves its cage.

13. In an air conditioned building divided into continuously lighted and darkened zones, supply stations in said lighted zones, endless trains of numbered cages, means for continuously moving said cages through their respective zones past their respective stations, means within each lighted zone for receiving eggs laid in the cages which pass through that zone, and for weighing each egg as it is received, a photographic camera for each lighter zone and means for operating the shutter of each camera at the time of weighing the egg to obtain a record of the weight of the egg and of the number of the cage from which it is removed.

14. A building comprising a central light excluding and air conditioned space flanked at each end by an outer compartment, means for dividing said inner space into continuously lighted and darkened zones, batteries of cages arranged in tiers, means for continuously moving said cages through their respective zones, continuously movable belts below the tiers of cages to carry droppings from the cages into said outer compartments, and means within said compartments for continuously cleaning said belts.

15. In a husbandry system, the combination with supply stations, of trains of cages arranged in series of horizontal tiers, means for continuously moving said trains of cages past the said stations to bring supplies from the stations within reach of the occupants of the cages, means for directing a continuous flood of suitable light to the stations and to the cages as they pass the stations, and means for maintaining the spaces between the stations continuously darkened.

16. A building comprising an inner light excluding and air conditioned space flanked by outer compartments, endless conveyors continuously movable within said space, batteries of cages carried by said conveyors, endless belts continuously movable under said cages, belt cleaning apparatus within said outer compartments, and means for passing the belts through said apparatus from the inner space and back into said space.

17. A building comprising an inner light excluding space flanked by outer compartments, endless conveyors continuously movable within said inner space, batteries of cages hung on said conveyors, endless belts beneath said cages and supported and carried along by said conveyors, belt cleaning devices within said outer compartments, and means for guiding the belts from the inner space through said devices and back into the inner space.

18. In a building comprising an inner light excluding space, endless oblong conveyors within said inner space positioned to travel with their long sides parallel to provide a passage between each pair, cages detachably mounted on said conveyors, means for lighting the space between each conveyor pair to illuminate the cages as they pass through said lighted passage, and means for excluding the light from the cages after they have passed out of said lighted passage.

19. In a building comprising an inner light excluding space, endless oblong conveyors within said inner space arranged to travel with their long sides parallel to provide a passage between each pair, cages detachably mounted on said conveyors, means for lighting the space between each conveyor pair to illuminate the cages as they pass through said lighted passage, feeding apparatus placeable within said passage directly in front of the passing cages, and means for excluding light from the cages as they leave said passage.

20. In a building comprising an inner light excluding space flanked by outer compartments, endless conveyors continuously movable within said space, batteries of cages carried by said conveyors, endless belts continuously movable under said cages, rinsing tanks within said outer compartments, scrubbing devices associated with said tanks, and means for passing the belts from the inner space through said tanks and devices and back into the inner space.

21. In a light controlled space, means dividing the space into light and dark zones, conveying means, cages supported by said means, perches mounted within said cages, and stationary means operable upon said perches to fold the perches out of the way when the cages pass through said lighted zones.

22. In a light excluding space, the combination with an endless conveyor, of cages mounted to move with said conveyor, means for lighting a portion of said space, means for excluding said light from the remaining portion of the space, feed containers movable within said lighted space to a position in front of said moving cages, perches pivotally mounted within said cages, and stationary means adjacent said cages to swing said perches out of the way while the cages pass through said lighted portion.

23. The combination with an endless oblong conveyor, of batteries of cages mounted in horizontal tiers on said conveyor, horizontal brackets on the conveyor below each tier of cages, an oblong endless belt of greater length than the conveyor mountable on said brackets below each tier of cages to project beyond the ends of the conveyor and to be carried along with the cages, and means for cleaning the projecting portions of said belts.

24. The combination with an endless conveyor, of cages mounted to move with said conveyor and provided with forwardly sloping bottoms projecting in front of the cages to form traps for eggs laid in the cages, a normally closed door in the bottom of each trap yieldable to the weight of an egg, stationary egg receiving and weighing apparatus in front of the cages, and stationary means for maintaining said doors positively closed until the cages pass in front of said receiving and weighing means, each door having been released from said closing means at this point being free to yield to pass an egg on to said receiving and weighing means.

25. The combination with an endless conveyor, of numbered cages mounted to move with said conveyor and provided with forwardly sloping bottoms projecting in front of the cages to form traps for eggs laid in the cages, a springheld door in the bottom of each trap, stationary means normally maintaining each door closed, stationary egg weighing means in front of the cages, the said closing means being designed to release the doors as they pass said weighing means to permit the weight of an egg on a door to depress the door against the tension of its spring and to pass the egg on to said weighing means, and means for imprinting the number of the cage on each egg as it passes out of the trap.

26. In a husbandry system, a light excluding building, a series of endless conveyors arranged in parallel relation to each other throughout the building to provide a work alley between each pair of conveyors, illuminating means in said alleys, containers for living beings mountable on said conveyors, service stations in said alleys, air conditioning means, and means erected within the building for excluding light from portions thereof thereby to create alternate light and dark zones through which the container carrying conveyors continuously pass.

27. In a light and air controlled space, an oblong conveyor, cages supported by said conveyor, a hollow screen within the conveyor having orifices facing said cages, air conditioning means, and means for circulating air from said means through the orifices of said screen past the said cages and out of the space.

28. In a husbandry system, in a light controlled building, in combination, means for creating light and dark zones, supply stations in the light zones, devices for maintaining living beings confined, and means for continuously and uninterruptedly carrying said devices past said supply stations to bring said beings within reach of said supplies and through said dark zones back to the light zones.

29. The combination with supply stations, of means for maintaining living beings in confinement, means for continuously and recurrently carrying said confining means past said stations to enable the confined beings to take supplies from the stations, and means dividing the distance covered by each being into alternate zones of light and darkness.

30. In a husbandry system a train of compartments for maintaining animals in confinement, means for continuously moving said compartments in an endless circuit, said compartments being arranged in horizontal tiers, and endless conveyors continuously movable with and extending beyond each tier of compartments for carrying away droppings from the compartments.

31. In a husbandry system, a train of compartments for maintaining animals in confinement, said train continuously moving in an endless circuit and arranged in horizontal tiers, endless conveyors continuously movable with and extending from each tier for carrying away droppings from said compartments, and means movable below all the tiers of compartments for re-receiving and continuously carrying away droppings that may fall beyond the said conveyors.

32. In a husbandry system, in a light excluding building, an elongated endless track, compartments for maintaining living beings in confinement continuously movable along said track, a partition occupying the lengthwise space within said track, means for suitably lighting the space on one side of said partition, and supply stations in said lighted space movable within reach of the occupants of said compartments.

33. In a husbandry system, in a light controlled building, means for creating alternate continuously lighted and continuously darkened zones, an endless track through said zones, conveying means continuously circulating along said track through said zones and made with projecting members, containers for maintaining living beings in confinement shaped to engage said members to maintain the containers detachably secured to said conveying means, and portable service station placeable in said lighted zones within reach of the occupants of the containers.

34. In a husbandry system, in combination, a space divided into continuously lighted and continuously darkened zones, endless means continuously circulating through said lighted and darkened zones, means for maintaining living beings in confinement secured to said circulating means, and portable service stations movable into said lighted zones to positions within reach of the occupants in confinement.

35. In a light and air controlled building space, endless oblong tracks within said space, conveyors on said tracks, means for continuously moving said conveyors along said tracks, containers carried by said conveyors, a hollow partition rising within each of said tracks from the floor to the ceiling of the space, said partitions having orifices distributed along the side walls and directed toward said containers, air conditioning apparatus without the space, means for forcing air from said apparatus into said hollow partitions from one end, and means for illuminating said space on one side of said partitions.

36. In a husbandry system, in a light controlled building, means for creating alternate continuously lighted and continuously darkened zones, service stations in said lighted zones, conveying means continuously passing through said zones, and compartments for maintaining domestic animals in confinement detachably secured to said conveying means and moving therewith past said stations to enable the confined animals to take supplies therefrom and through said darkened zones.

FAY D. CORNELL.